Oct. 6, 1936. M. KULICK 2,056,279
CASSETTE
Filed July 30, 1934
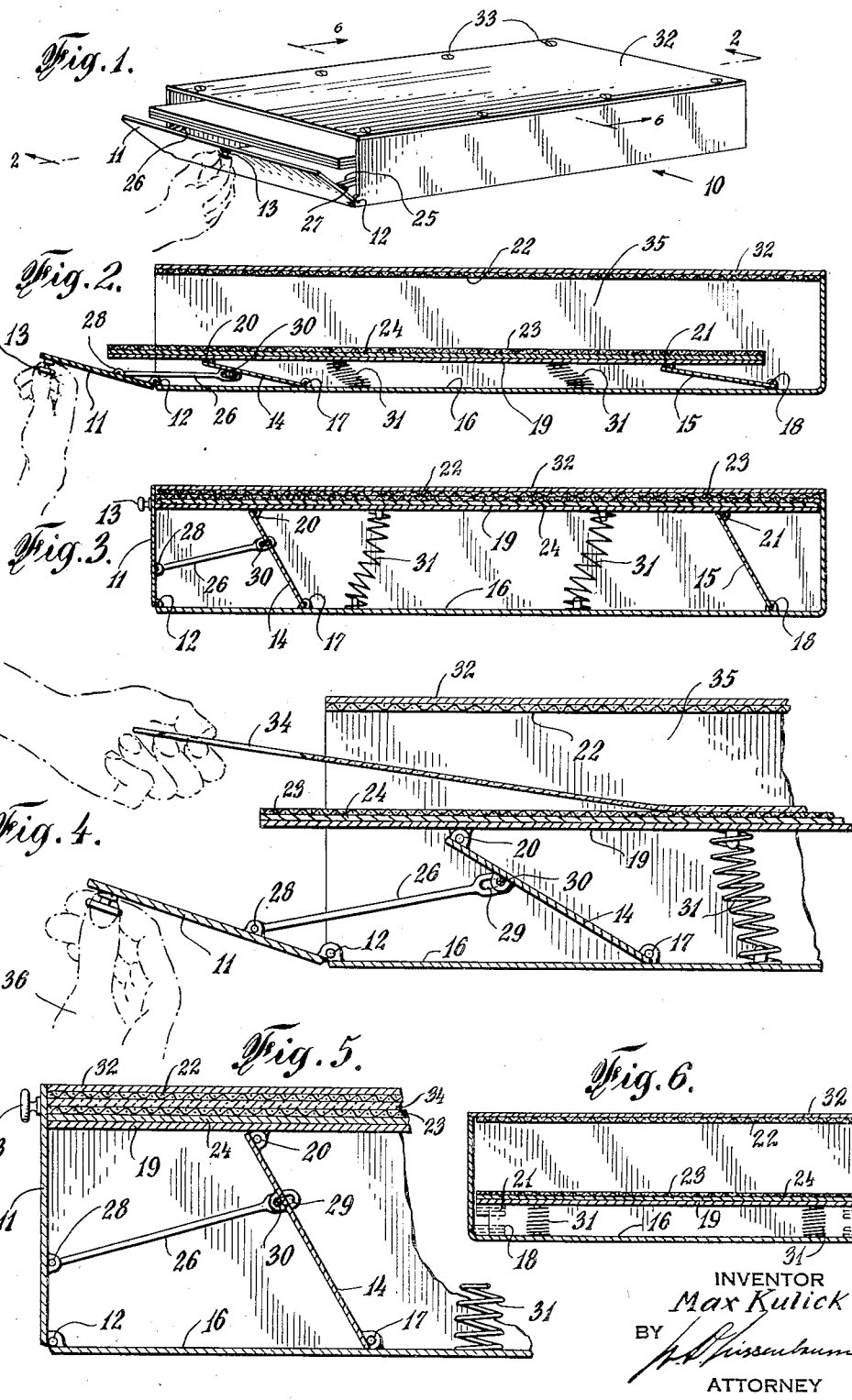
INVENTOR
Max Kulick
BY
ATTORNEY Patented Oct. 6, 1936

2,056,279

UNITED STATES PATENT OFFICE 2,056,279

CASSETTE

Max Kulick, Brooklyn, N. Y.

Application July 30, 1934, Serial No. 737,556

5 Claims. (Cl. 250—34)

The present invention relates to cassettes or film holders used in X-ray photography, and particularly to the type employing a pair of intensifying screens, between which the film lies.

The principal object of this invention is to provide a cassette of novel and improved construction and of the type described, which can be easily manipulated and used in the dark and which permits easy insertion of the film therein and convenient access for the withdrawal of same therefrom, obviating the handling, soiling or otherwise spoiling the intensifying screens, whereby the useful life of the latter is materially lengthened and the necessity and frequency of cleaning said screens are substantially decreased.

Another object of the present invention is to provide a novel and improved cassette of the character mentioned, embodying means to effect and maintain absolute surface contact between the film and the screens while the cassette is in use, to insure the production of true and sharp images; thereby avoiding distorted images.

A further object of this invention is to provide an article of the class mentioned, which is simple in construction, cheap to manufacture, easy to work with, and which is efficient and durable in use.

To attain these objects, in an embodiment of my present invention, I provide a cassette comprising a box structure having an opening at one end and means to close said end. Said opening is for the insertion or withdrawal of a photographic film, between, or from between a pair of intensifying screens, mounted, one to the ceiling of the box and the other atop a moveable platform therein. Springs urge the platform upwards, so that the screens are in surface contact with the film when the box is shut, and I provide means whereby upon opening the box, the platform will automatically move downwards therein, thereby separating the screens, while upon closing the box, the platform will automatically move upwards therein, thereby bringing the screens together.

This invention is capable of numerous forms and various applications without departing from the essential features herein disclosed. It is therefore intended and desired that the embodiment shown herein be deemed illustrative and not restrictive, and that the patent shall cover whatever features of patentable novelty exist in the invention disclosed; reference being had to the appended claims rather than to the specific description herein to indicate the scope of the invention.

In the accompanying drawing, forming part of this application, similar characters of reference indicate corresponding parts in all the views.

Fig. 1 is a perspective view of a cassette embodying my present invention.

Fig. 2 is a section taken at line 2—2 in Fig. 1, showing the cassette open at one end and the screens apart.

Fig. 3 is a similar section showing the cassette closed and the screens in surface contact.

Fig. 4 is an enlarged fragmentary portion of Fig. 2, showing a film being inserted into the cassette between the screens.

Fig. 5 is an enlarged fragmentary portion of Fig. 3, showing the screens in surface contact with the film between them.

Fig. 6 is a section taken at line 6—6 in Fig. 1.

In the drawing, the numeral 10 designates generally a box structure or casing, having an end 11 hinged to the bottom thereof at 12, so that the box 10 may be opened or closed by handling a knob 13, mounted on the outside of said end 11. A pair of plate members 14 and 15, are hinged in parallel relation at their lower ends to the floor 16, of box 10, at 17 and 18. At their upper ends, these plates are respectively hinged to a platform 19, at 20 and 21, so that points 17, 18, 21 and 20 determine a parallelogram, which link construction will maintain the platform 19, always parallel to the ceiling of the box 10, to which is secured an intensifying screen 22. A second intensifying screen 23, is mounted atop the platform 19, over a lead sheeting 24. It is evident that said screens will always be in parallel relation regardless of the position of the platform 19, whether the latter is lowered or raised within the casing 10.

A pair of links 25 and 26, are each pivotally secured at one of their ends to the inside of the box end 11, at points 27 and 28 respectively, lying above the hinge 12. At their other ends, each of said links are provided with a slot 29, through which project the free ends of a horizontal pin 30, secured to the plate 14. A series of compression springs 31, mounted upright, are each secured at their bottom ends to the floor of the casing 10, and at their top ends to the underside of the platform 19.

The casing 10 has a removable top member 32, secured by screws 33, which member is made of aluminum or other material allowing free passage to X-rays. In fact the entire casing 10 may be made of such material. However, instead of lead for the plate 24, any other material may be used which is impervious to the X-rays. The intensifying screens 22 and 23, are sheetings usually treated with calcium tungstate, are known in the art and serve to enhance the action of the X-rays on the photographic film 34.

For automatic alignment, the ceiling of casing 10, the screens 22 and 23, and the film 34, are equal in size, and when the cassette is closed as in Fig. 3, the screens shall coincide.

In operation, the end 11, is swung open and a film 34 is inserted into the cassette to lie between the screens 22 and 23; the platform 19, having automatically been moved downward and a little out of the casing 10, thereby creating a space 35 between the screens, by the action of links 25 and 26 upon the parallelogram structure aforesaid, while the springs 31 have become further compressed.

Now, the hand 36 releases its hold, whereupon the springs 31 will shift the platform 19 upwards, automatically closing the cassette, for the end 11, will swing back to its original position. Pin 30, being free to travel in slots 29, will permit the springs 31 to push the platform 19, further upward into the cassette, thereby causing and maintaining full surface contact between the screens 22 and 23 with the film 34 between them. The cassette is now prepared to be placed in an X-ray machine in the line of emanation; the limb or body to be X-rayed being placed on or against the cassette top member 32. It is evident, that upon opening the cassette, the film 34, may be withdrawn.

I claim:—

1. In a cassette of the type described for holding a photographic film, a casing having a top which is pervious to the passage of X-rays, a platform moveably mounted within the casing; said casing being provided with an opening for the insertion therein of a photographic film onto the platform, a cover for said opening and means connecting the cover and platform, adapted upon the closing of said opening by the cover, to simultaneously shift the platform towards the said top and also adapted upon the clearing of the opening in the casing by the cover, to simultaneously shift the platform away from said top, whereby the film may be withdrawn through the opening in the casing.

2. In a cassette as in claim 1, wherein the platform is movably mounted in constant parallel relation with the top of the casing.

3. In a cassette of the type described for holding a photographic film, a box structure having its top pervious to the passage of X-rays and a hinged end member to open and shut the box, a platform moveably mounted within the box, link means associated with the platform and said end member, adapted upon movement of the said end member to alter the distance between the platform and the box top; said platform being nearest said top when the hinged end closes the box, and furthest when said end is moved to open the box.

4. In a cassette of the type described for holding a photographic film, a casing having a top which is pervious to the passage of X-rays, a pair of intensifying screens within the casing, one fixed to said top and the other moveably mounted; said casing being provided with an opening for the insertion therein of a photographic film between the screens, a cover for said opening and means in contact with the cover and moveable screen, adapted upon the closing of said opening by the cover to simultaneously shift the moveable screen towards the fixed screen, whereby the screens come into surface contact with the film intended to lie between them; said means being also adapted upon the clearing of the opening in the casing, to simultaneously shift the moveable screen whereby the film may be withdrawn from said casing through the opening therein.

5. In a cassette of the type described for holding a photographic film, a box structure having a top which is pervious to the passage of X-rays, and a hinged end component to open and close the box, a platform within the box adapted to receive a photographic film upon it, a pair of members hinged at one of their respective ends to the bottom of the box and hinged at their other ends to the underside of said platform, a link pivotally secured at one end to one of said members and at its other end to said end component of the box; said platform being nearest the top when the hinged end is in position to close the box, and furthest when the hinged end is swung to open the box.

MAX KULICK.